United States Patent
Rohall

(10) Patent No.: US 8,396,897 B2
(45) Date of Patent: Mar. 12, 2013

(54) METHOD, SYSTEM, AND COMPUTER PROGRAM PRODUCT FOR THREADING DOCUMENTS USING BODY TEXT ANALYSIS

(75) Inventor: Steven L. Rohall, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 2732 days.

(21) Appl. No.: 10/994,780

(22) Filed: Nov. 22, 2004

(65) Prior Publication Data

US 2006/0112120 A1 May 25, 2006

(51) Int. Cl.
*G06F 7/00* (2006.01)
*G06F 17/30* (2006.01)

(52) U.S. Cl. ......... 707/802; 707/791; 707/811; 713/176

(58) Field of Classification Search .................. None
See application file for complete search history.

(56) References Cited

U.S. PATENT DOCUMENTS

| | | | |
|---|---|---|---|
| 5,905,863 A * | 5/1999 | Knowles et al. | 709/206 |
| 6,658,626 B1 | 12/2003 | Aiken | |
| 7,216,115 B1 * | 5/2007 | Walters et al. | 707/3 |
| 2002/0073157 A1 | 6/2002 | Newman et al. | |
| 2003/0163537 A1 | 8/2003 | Rohall et al. | |
| 2003/0217335 A1 * | 11/2003 | Chung et al. | 715/514 |
| 2004/0044735 A1 | 3/2004 | Hoblit | |
| 2004/0117449 A1 | 6/2004 | Newman et al. | |
| 2005/0060643 A1 * | 3/2005 | Glass et al. | 715/501.1 |
| 2005/0132197 A1 * | 6/2005 | Medlar | 713/176 |

\* cited by examiner

*Primary Examiner* — Khanh Pham
*Assistant Examiner* — Azam Cheema
(74) *Attorney, Agent, or Firm* — Edward Choi; Hoffman Warnick LLC

(57) ABSTRACT

A method, system, and computer program product for threading documents using body text analysis. The method comprises: computing a fingerprint for each of a plurality of documents by analyzing text in a body of each document; comparing the computed fingerprints to determine a set of documents from the plurality of documents whose fingerprints are sufficiently similar; and ordering the set of documents to create at least one parent-child relationship.

23 Claims, 5 Drawing Sheets

US 8,396,897 B2

METHOD, SYSTEM, AND COMPUTER PROGRAM PRODUCT FOR THREADING DOCUMENTS USING BODY TEXT ANALYSIS

BACKGROUND OF THE INVENTION

1. Field of the Invention

The present invention relates generally to electronic documents. More specifically, the present invention provides a method, system, and computer program product for threading documents using body text analysis.

2. Background Art

Many document repositories contain documents which have parent-child relationships. For example, a document repository may include some number of main "memo" documents, and each main "memo" document can have one or more associated "reply" documents. Each of these reply documents can, in turn, have one or more of its own "reply" documents, and so on. The set of messages comprising a top-level memo and all of its ancestors is called a "thread." An email database is one such document repository where a thread of messages is created using, for example, the email client "Reply" function to respond to an email message. A discussion database or a Usenet newsgroup are other examples of repositories which contain threaded documents.

Typically, the threads in the repository are computed using the documents' unique identifiers (UID). Each document in the repository has a UID. When a document is replied to, the reply document records the value of its parent's UID. In an IBM Lotus Notes database, for example, the UID is the document's universal identifier and the UID of the parent is stored in the document's "$REF" item. For Usenet news, the UID is the document's "Message-ID" and the parent is stored in the "In-Reply-To" item. The threads in the database can be easily calculated using the following algorithm:

1) For any document in the repository, get the value of its parent's UID.
2) Go to the parent and repeat step 1 until a document is found without a parent. This document is the root of the tree.
3) Search the repository for all documents which have a parent UID which is the same as the root's UID.
4) For each such child found, repeat step 3 with the child's UID in place of the root's UID until no more children are found.
5) At this point, the entire thread has been discovered.

This algorithm, or more-efficient variants, is used in a number of Usenet newsreaders and email clients, including Lotus Notes.

This algorithm works very well in a discussion database or a Usenet database where the database serves as an archive of the entire discussion. This algorithm, however, does not work well in an email database since a user of the email database may not save sent messages and/or may delete messages. These missing messages result in holes in the thread trees and cause the algorithm to produce two or more smaller trees where one tree should have been computed.

A standard approach to handle this problem is to combine these smaller trees by comparing the subjects of the messages. Often in these repositories, creating a reply message causes the new message to be constructed with the same subject prepended with "Re:" or "Fwd:" or variants thereof. These prefixes are stripped off and subject lines are compared in order to piece the thread tree together. For example, if the original message has a subject of "patent," a reply to that message may have the subject "Re: patent," and a reply to the reply may have the subject "Re: patent," "Re: Re: patent," or "Re[2]: patent," using some common prefix idioms. A well-known implementation of a threading algorithm which takes account of both UIDs and subjects can be found in Zawinski.

Subject-based threading helps, but it does not solve this problem. For example, if someone changes the subject of their message (e.g., changes one of the replies in the discussion above to "bar was Re: patent"), then the threading algorithm will fail. In general, subject-based threading will fail if the subject differs in any significant way from anticipated prefixes, such as those described above.

SUMMARY OF THE INVENTION

In general, the present invention provides a method, system, and computer program product for threading documents using body text analysis. In particular, the present invention creates a fingerprint from the body text of each document (e.g., email message) and then compares fingerprints to determine if one fingerprint is related to another. If the fingerprints of a plurality of documents are sufficiently similar, those documents are ordered in a parent-child relationship according to, for example, date.

A first aspect of the present invention provides a method for threading documents, comprising: computing a fingerprint for each of a plurality of documents by analyzing text in a body of each document; comparing the computed fingerprints to determine a set of documents from the plurality of documents whose fingerprints are sufficiently similar; and ordering the set of documents to create at least one parent-child relationship.

A second aspect of the present invention provides a system for threading documents, comprising: a system for computing a fingerprint for each of a plurality of documents by analyzing text in a body of each document; a system for comparing the computed fingerprints to determine a set of documents from the plurality of documents whose fingerprints are sufficiently similar; and a system for ordering the set of documents to create at least one parent-child relationship.

A third aspect of the present invention provides a program product stored on a recordable medium for threading documents, which when executed comprises: program code for computing a fingerprint for each of a plurality of documents by analyzing text in a body of each document; program code for comparing the computed fingerprints to determine a set of documents from the plurality of documents whose fingerprints are sufficiently similar; and program code for ordering the set of documents to create at least one parent-child relationship.

A fourth aspect of the present invention provides a method for deploying an application for threading documents, comprising: providing a computer infrastructure being operable to: compute a fingerprint for each of a plurality of documents by analyzing text in a body of each document; compare the computed fingerprints to determine a set of documents from the plurality of documents whose fingerprints are sufficiently similar; and order the set of documents to create at least one parent-child relationship.

A fifth aspect of the present invention provides computer software embodied in a propagated signal for threading documents, the computer software comprising instructions to cause a computer system to perform the following functions: compute a fingerprint for each of a plurality of documents by analyzing text in a body of each document; compare the computed fingerprints to determine a set of documents from the plurality of documents whose fingerprints are sufficiently similar; and order the set of documents to create at least one parent-child relationship.

BRIEF DESCRIPTION OF THE DRAWINGS

These and other features of this invention will be more readily understood from the following detailed description of the various aspects of the invention taken in conjunction with the accompanying drawings in which.

Figure 1:
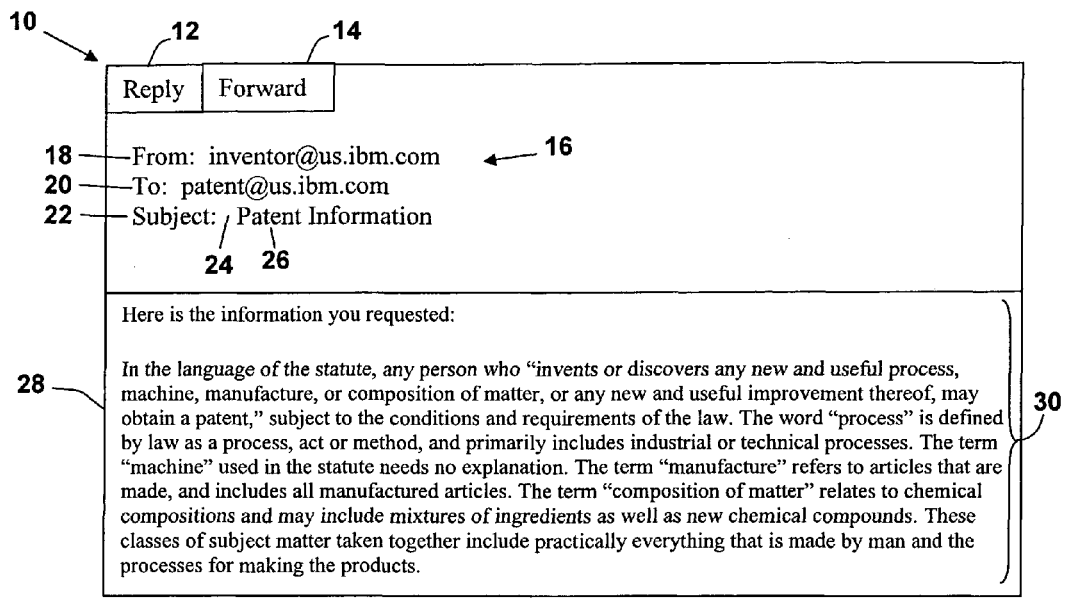
FIGS. 1-3 depict a plurality of related emails.

The drawings are merely schematic representations, not intended to portray specific parameters of the invention, and are not necessarily to scale. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for threading documents using body text analysis. In particular, the present invention creates a fingerprint from the body text of each document (e.g., email message) and then compares fingerprints to determine if one fingerprint is related to another. If the fingerprints of a plurality of documents are sufficiently similar, those documents are ordered in a parent-child relationship according to, for example, date.

The present invention is described below using documents comprising email messages. It should be noted, however, that the present invention can be used to thread any type of documents that can be arranged in a hierarchical (e.g., parent-child) structure.

An illustrative email 10 is depicted in FIG. 1. The email 10 generally includes a Reply button 12 for replying to the sender of the email 10, and a Forward button 14 for forwarding the email 10 to another party. The email 10 also includes an informational section 16 that contains the name or email address 18 of the sender of the email 10, the name or email address 20 of the recipient of the email 10, and a subject line 22 containing the subject 26 of the email 10 and a subject prefix 24 (e.g., Reply (Re:), Forward (Fw:), none, etc.). In this example, the subject prefix 24 comprises "none" (i.e., no subject prefix is shown). This is typically the case for an original email sent to a recipient. The email 10 also includes a message section 28 that contains the body text 30 of the email 10. In this example, the body text 30 of the email in the message section 28 of the original (i.e., parent) email 10 comprises:

"Here is the information you requested:

In the language of the statute, any person who "invents or discovers any new and useful process, machine, manufacture, or composition of matter, or any new and useful improvement thereof, may obtain a patent," subject to the conditions and requirements of the law. The word "process" is defined by law as a process, act or method, and primarily includes industrial or technical processes. The term "machine" used in the statute needs no explanation. The term "manufacture" refers to articles that are made, and includes all manufactured articles. The term "composition of matter" relates to chemical compositions and may include mixtures of ingredients as well as new chemical compounds. These classes of subject matter taken together include practically everything that is made by man and the processes for making the products."

When users reply to email messages, they often include portions of the message to which they are replying. This is usually achieved with a "Reply With History" function available in many common email client programs. In some cases, such as in Lotus Notes, the body of the message being replied to is put at the bottom of the new message being created. In other email client programs such as Qualcomm Eudora, the body of the original message is put into the new message and each line is prepended with a special character, such as a greater-than sign ">," indicating that the text is quoted text from the original message. The user composing the new message is then able to add comments to the message and then send it. These new comments may be interspersed with the quoted text from the original message.

Figure 2:
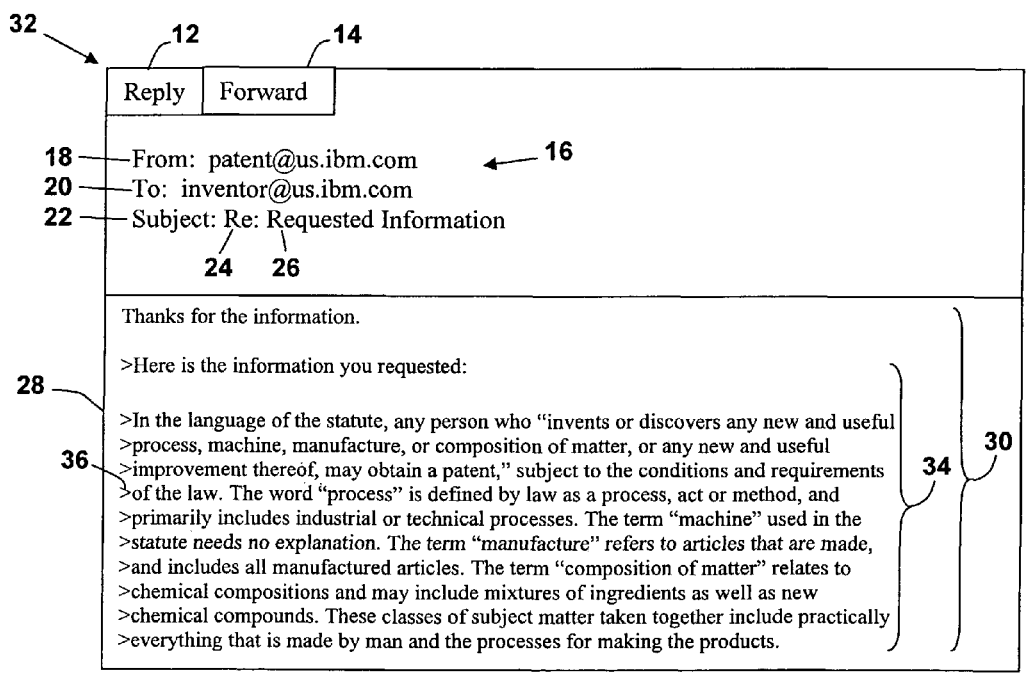

An example of the use of a special character indicating quoted text from a received email is illustrated in FIG. 2. In particular, an email 32 sent in response to the received email 10 of FIG. 1 is illustrated in FIG. 2. Each line of quoted text 34 from the received email 10 is delineated by the special character 36 ">." In email 32, the body text 30 of the email in message section 28 comprises:

"Thanks for the information.

>In the language of the statute, any person who "invents or discovers any new and useful >process, machine, manufacture, or composition of matter, or any new and useful >improvement thereof, may obtain a patent," subject to the conditions and requirements >of the law. The word "process" is defined by law as a process, act or method, and >primarily includes industrial or technical processes. The term "machine" used in the >statute needs no explanation. The term "manufacture" refers to articles that are made, >and includes all manufactured articles. The term "composition of matter" relates to >chemical compositions and may include mixtures of ingredients as well as new >chemical compounds. These classes of subject matter taken together include practically >everything that is made by man and the processes for making the products."

Figure 3:
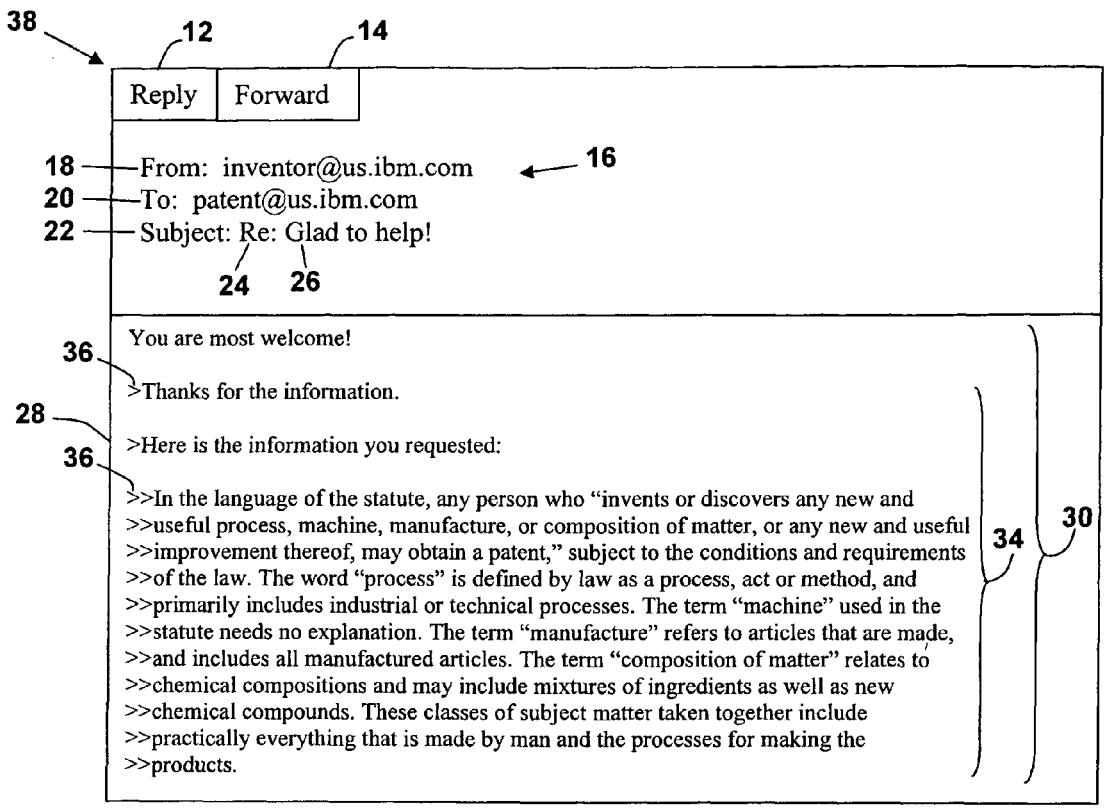

An email 38 sent in response to the email 32 of FIG. 2 is illustrated in FIG. 3. In email 38, the body text 30 of the email in message section 28 comprises:

"You are most welcome!

>Thanks for the information.

>>In the language of the statute, any person who "invents or discovers any new and >>useful process, machine, manufacture, or composition of matter, or any new and useful >>improvement thereof, may obtain a patent," subject to the conditions and requirements
>>of the law. The word "process" is defined by law as a process, act or method, and
>>primarily includes industrial or technical processes. The term "machine" used in the
>>statute needs no explanation. The term "manufacture" refers to articles that are made,
>>and includes all manufactured articles. The term "composition of matter" relates to
>>chemical compositions and may include mixtures of ingredients as well as new
>>chemical compounds. These classes of subject matter taken together include
>>practically everything that is made by man and the processes for making the
>>products."

Although the emails 10, 32, and 38 are clearly related, subject-based threading algorithms will not able to successfully thread the emails 10, 32, 38 together because each email 10, 32, and 38 includes a different subject 26. In accordance with the present invention, however, threading is accomplished by analyzing the body text 30 of emails instead of the subject 26.

Figure 4:
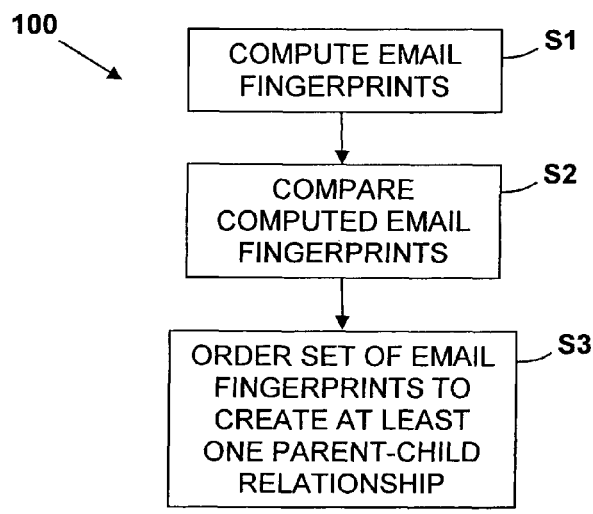
FIG. 4 depicts a flow diagram illustrating the process flow of a method in accordance with an embodiment of the present invention.

A flow diagram 100 of an algorithm for threading documents (e.g., emails) using body text analysis in accordance with an embodiment of the present invention is illustrated in FIG. 4. In step S1, a fingerprint is computed for each email. In step S2, the computed email fingerprints are compared to each other to determine a set of emails whose fingerprints are sufficiently similar. In step S3, the set of emails are ordered to create at least one parent-child relationship.

Figure 5:
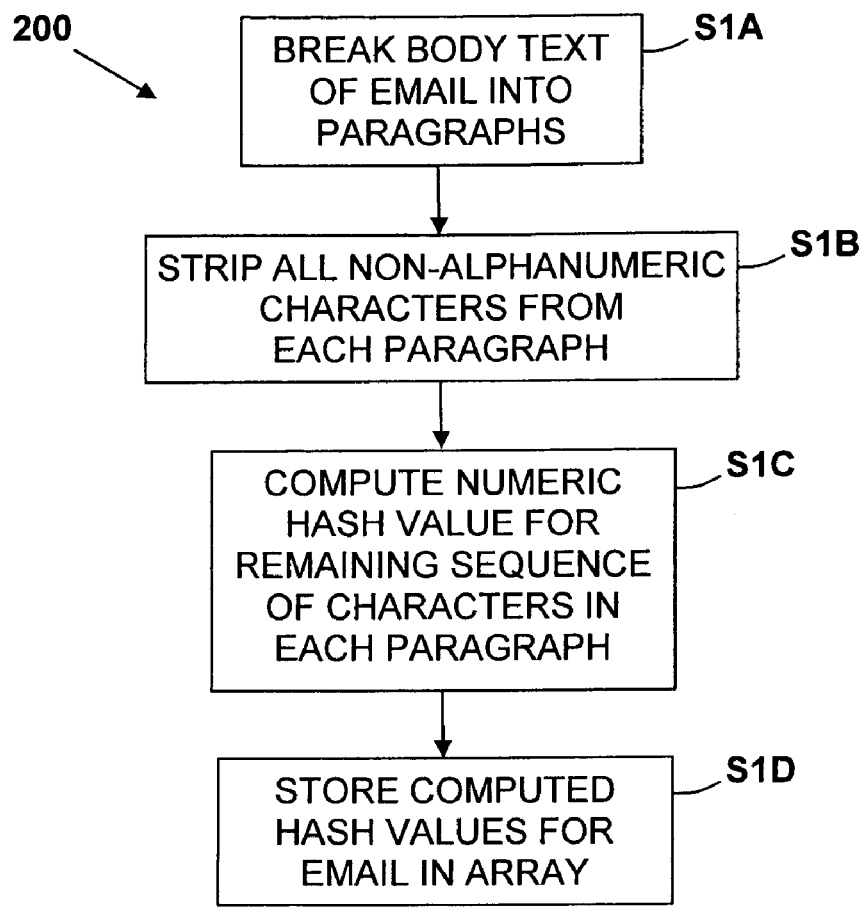
FIG. 5 depicts a more detailed flow diagram of the process flow which occurs in step S1 of FIG. 4.

A flow diagram 200 illustrating step S1 of FIG. 1 in greater detail is illustrated in FIG. 5. In step S1A the body text of each email is broken into paragraphs The paragraphs can be delineated, for example, by the presence of hard carriage returns in the body text of an email (hard carriage returns typically represent the separations among quoted text and new comments in an email) or using other suitable techniques. Once the body text of an email is broken into paragraphs, then in step S1B, for each paragraph, all non-alphanumeric characters are stripped away. This eliminates the problem with quoting characters such as ">" and line breaks that the email client may have inserted. In step SIC, for the sequence of characters which remains in each paragraph after all non-alphanumeric characters have been stripped away, a numeric hash value is computed. Any hashing function which guarantees that the same hash will be computed for a given input can be used. Examples of suitable hashing functions include MD5, Pearson's Hash, RC4, and SHA. In step S1D, the hash values computed for the email are stored in an array of such values. This array comprises the fingerprint of the email.

It should be noted that document divisions other than paragraphs can be used in the practice of the present invention. For example, the body text can be broken into sentences. For each sentence, all non-alphanumeric characters are stripped away, and a numeric hash is computed the sequence of remaining characters in the sentence. The computed hash vales are stored in an array which comprises the fingerprint of the email. The similarity between each fingerprint can be determined as described in greater detail below.

Figure 6:
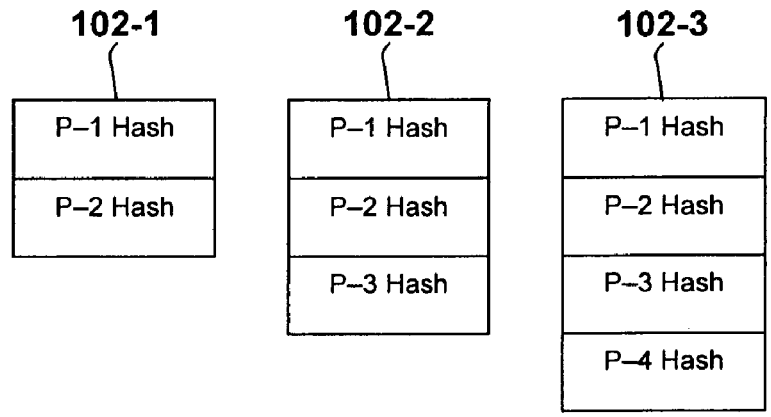
FIG. 6 depicts illustrative fingerprints computed in accordance with an embodiment of the present invention.

When the above-described process is applied to the email 10 illustrated in FIG. 1, an array including 2 hash values is produced (i.e., one hash value for each paragraph after stripping of all non-alphanumeric characters). Similarly, arrays including 3 and 4 values are produced for the emails 32 and 38 illustrated in FIGS. 2 and 3, respectively. Illustrative arrays 102-1, 102-2, and 102-3, containing resultant hash values 102 computed for the paragraphs P (e.g., P-1, P-2, etc.) in each of the emails 10, 32, and 38, respectively, are illustrated in FIG. 6. Arrays 102-1, 102-2, and 102-3 comprise the fingerprints of the emails 10, 32, and 38, respectively.

Figure 7:
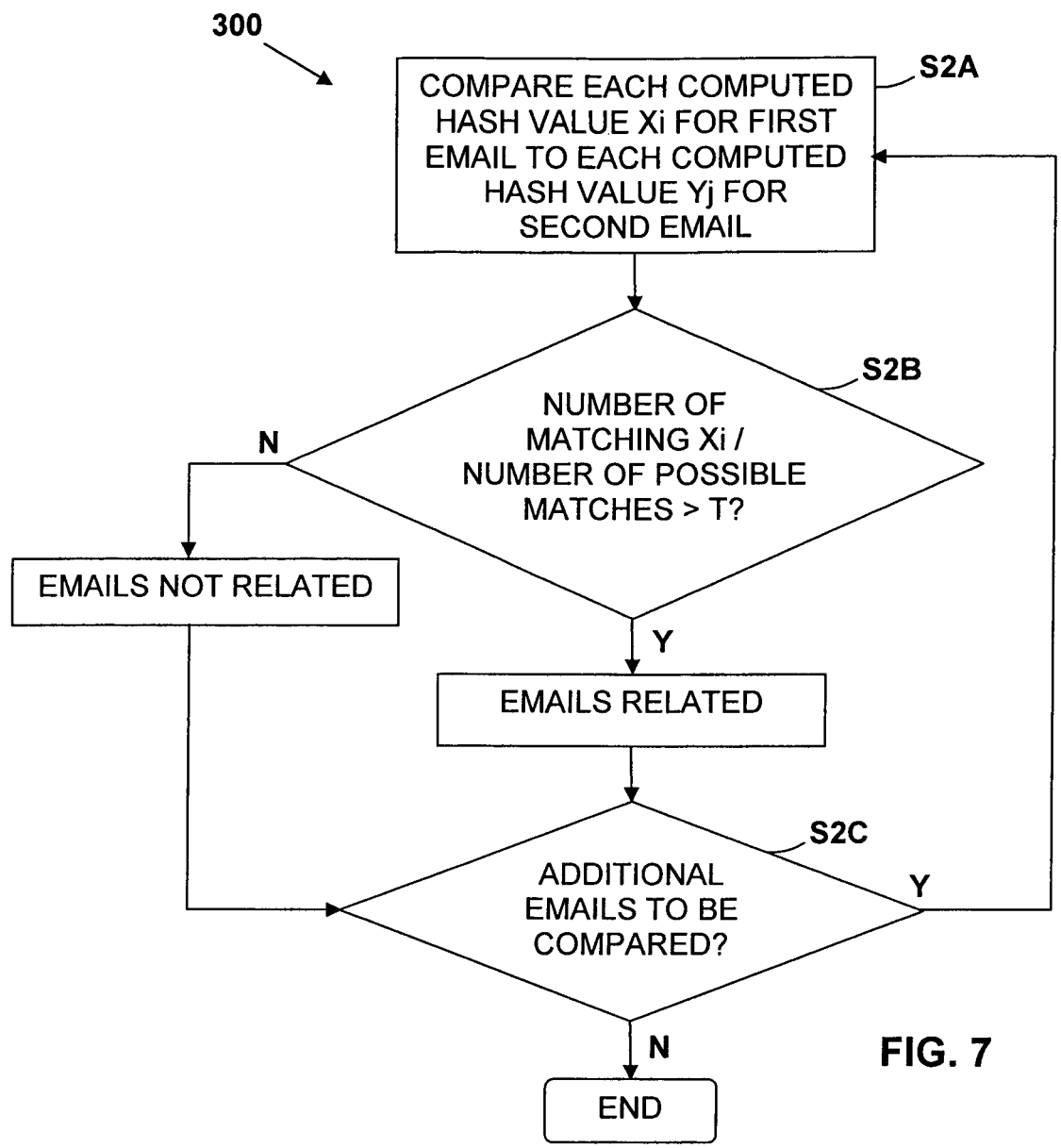
FIG. 7 depicts a more detailed flow diagram of the process flow which occurs in step S2 of FIG. 4.

To determine if one email is related to another (step S2, FIG. 4), the fingerprints of the emails are compared with one another. For example, as depicted in the flow diagram 300 illustrated in FIG. 7, the following algorithm can be used:
(Step S2A) If a first email has X hash values in its fingerprint and a second email has Y hash values in its fingerprint, then each $x_i$ in X is compared to $y_j$ in Y.
(Step S2B) If (number of matching $x_i$/number of possible matches)>T, where T is an application-specific threshold representing the amount (e.g., percentage) of textual overlap desired, then the two emails are related.
(Step S2C) Repeat steps S2A and S2B for each different pair of emails under consideration.
Other suitable comparison algorithms can also be used in the practice of the present invention.

Figure 8:
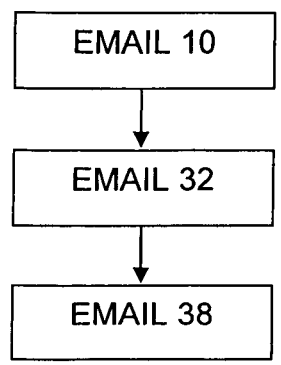
FIG. 8 illustrates the related emails of FIGS. 1-3 when processed and ordered in accordance with an embodiment of the present invention.

Those emails that are found to be sufficiently related to each other in step S2B (i.e., those emails that overlap to an acceptable percentage) are then ordered in step S3 (FIG. 4) (e.g., by date) to create a parent-child relationship. The date can comprise, for example, the date the email was sent, the date the email was received, the date the email was last modified, etc. Other factors for ordering the emails which have been found to be sufficiently related to each other can also be used. Using the above method, the related emails 10, 32, and 38 would be ordered as shown in FIG. 8.

It should be noted that the present invention need not be limited to the text of the body of the email alone; it could also be used to compare the subjects of the emails in a more-robust manner than the simple string matching currently employed. Further, it should also be noted that the present invention can be used as a supplement to unique identifier-based matching when available. In other words, after UID-based matching has occurred, the fingerprint-based matching of the present invention can be used to try to join roots of trees to the leaves of existing trees in an effort to combine and extend those trees. Also note that the subject line of the message can be treated as just another paragraph in the body.

In another embodiment, a slightly different, and more efficient approach for threading documents by date can be used. Given a document and its fingerprint, to find the document's parent, search backward in time comparing fingerprints. When a match is found which exceeds the threshold, stop looking and make that document the parent of the other document.

Figure 9:
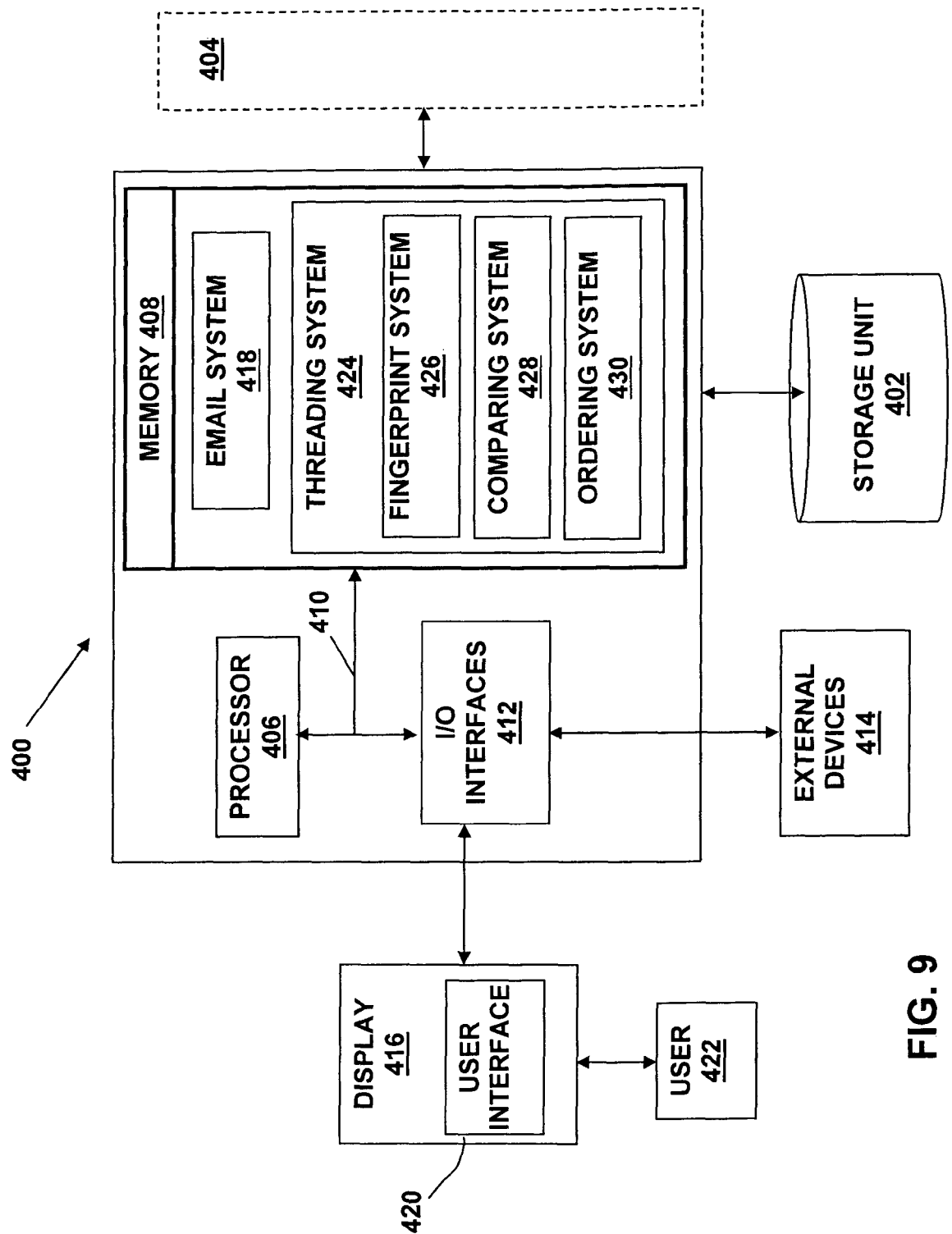
FIG. 9 depicts a computer system for implementing a method in accordance with an embodiment of the present invention.

Referring now to FIG. 9, there is illustrated a computer system 400 for threading documents using body text analysis in accordance with the present invention. Computer system 400 is intended to represent any type of computerized system capable of implementing the methods of the present invention. For example, computer system 400 may comprise a desktop computer, laptop, workstation, server, PDA, cellular phone, pager, etc.

Emails, arrays of hash values, and other data used in the practice of the present invention can be stored locally to computer system 400, for example, in storage unit 402, and/or may be provided to computer system 400 over a network 404. Storage unit 402 can be any system capable of providing storage for data and information under the present invention. As such, storage unit 402 may reside at a single physical location, comprising one or more types of data storage, or may be distributed across a plurality of physical systems in various forms. In another embodiment, storage unit 402 may be distributed across, for example, a local area network (LAN), wide area network (WAN) or a storage area network (SAN) (not shown).

Network 404 is intended to represent any type of network over which data can be transmitted. For example, network 404 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown in FIG. 9, computer system 400 generally includes a processor 406, memory 408, bus 410, input/output (I/O) interfaces 412 and external devices/resources 414. Processor 406 may comprise a single processing unit, or may be distributed across one or more processing units in one or more locations, e.g., on a client and server. Memory 408 may comprise any known type of data storage and/or transmission media, including magnetic media, optical media, random access memory (RAM), read-only memory (ROM), etc. Moreover, similar to processor 406, memory 408 may reside at a single physical location, comprising one or more types of data storage, or be distributed across a plurality of physical systems in various forms.

I/O interfaces 412 may comprise any system for exchanging information to/from an external source. External devices/resources 414 may comprise any known type of external device, including speakers, a CRT, LED screen, handheld device, keyboard, mouse, voice recognition system, speech output system, printer, monitor/display (e.g., display 416), facsimile, pager, etc.

Bus 410 provides a communication link between each of the components in computer system 400, and likewise may comprise any known type of transmission link, including electrical, optical, wireless, etc. In addition, although not shown, additional components, such as cache memory, communication systems, system software, etc., may be incorporated into computer system 400.

Shown in memory 408 is email system 418, which can be any known or later developed system/program capable of providing email messaging capabilities. Email system 418 provides a user interface 420 for displaying emails to user 422 on display 416. Also shown in memory 408 is a threading system 424 for threading documents using body text analysis in accordance with the present invention, which may be provided as computer program product. Threading system 424 includes a fingerprint system 426 for computing email fingerprints, a comparing system 428 for comparing email fingerprints to each other to determine a set of emails whose fingerprints are sufficiently similar, and an ordering system 430 for ordering the set of emails to create at least one parent-child relationship.

It should be appreciated that the teachings of the present invention could be offered as a business method on a subscription or fee basis. For example, computer system 400 could be created, maintained, supported, and/or deployed by a service provider that offers the functions described herein for customers. That is, a service provider could be used to thread documents using body text analysis, as describe above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for threading documents, comprising:
    computing a fingerprint for each of a plurality of documents by analyzing text in a body of each document, wherein the fingerprint computing further comprises:
        breaking each document into paragraphs;
        stripping a predetermined set of characters from each paragraph;
        computing a value for remaining characters in each paragraph; and
        collecting the computed values for each paragraph to provide the fingerprint;
    comparing the computed fingerprints to determine a set of documents from the plurality of documents whose fingerprints are sufficiently similar; and
    ordering the set of documents to create at least one parent-child relationship.

2. The method of claim 1, wherein each document comprises an email.

3. The method of claim 1, wherein the predetermined set of characters comprises non-alphanumeric characters.

4. The method of claim 1, wherein the computed value comprises a hash value.

5. The method of claim 1, wherein the step of comparing the computed fingerprints to determine a set of documents whose fingerprints are sufficiently similar further comprises:
    comparing the computed values for each paragraph of a first document to the computed values for each paragraph of a second document;
    determining a number of matches of the computed values; and
    determining that the first and second documents are related based on the number of matches.

6. The method of claim 5, wherein the step of determining that the first and second documents are related based on the number of matches further comprises;

dividing the number of matches by a number of possible matches; and determining that the first and second documents are related if a result of the dividing step is above a predetermined threshold value.

7. The method of claim 1, wherein the set of documents are ordered based on date.

8. A computer system for threading documents, comprising:

at least one processing unit;

a memory operably associated with the at least one processing unit; and a document threading system storable in memory and executable by the at least one processing unit, the threading system comprising:

a system for computing a fingerprint for each of a plurality of documents by analyzing text in a body of each document, wherein the fingerprint computing system further comprises:

a system for breaking each document into paragraphs;

a system for stripping a predetermined set of characters from each paragraph;

a system for computing a value for remaining characters in each paragraph; and a system for collecting the computed values for each paragraph to provide the fingerprint;

a system for comparing the computed fingerprints to determine a set of documents from the plurality of documents whose fingerprints are sufficiently similar; and a system for ordering the set of documents to create at least one parent-child relationship.

9. The computer system of claim 8, wherein each document comprises an email.

10. The computer system of claim 8, wherein the predetermined set of characters comprises non-alphanumeric characters.

11. The computer system of claim 8, wherein the computed value comprises a hash value.

12. The computer system of claim 8, wherein the system for comparing the computed fingerprints to determine a set of documents whose fingerprints are sufficiently similar further comprises:

a system for comparing the computed values for each paragraph of a first document to the computed values for each paragraph of a second document;

a system for determining a number of matches of the computed values; and a system for determining that the first and second documents are related based on the number of matches.

13. The computer system of claim 12, wherein the system for determining that the first and second documents are related based on the number of matches further comprises:

a system for dividing the number of matches by a number of possible matches; and a system for determining that the first and second documents are related if a result of the dividing step is above a predetermined threshold value.

14. The computer system of claim 8, wherein the set of documents are ordered based on date.

15. A computer program product, stored on a non-transitory computer readable medium comprising computer usable program code, which when executed by a computer, enables the computer to:

compute a fingerprint for each of a plurality of documents by analyzing text in a body of each document, wherein the fingerprint computing comprises:

breaking each document into paragraphs;

stripping a predetermined set of characters from each paragraph;

computing a value for remaining characters in each paragraph; and collecting the computed values for each paragraph to provide the fingerprint;

compare the computed fingerprints to determine a set of documents from the plurality of documents whose fingerprints are sufficiently similar; and order the set of documents to create at least one parent-child relationship.

16. The computer program product of claim 15, wherein each document comprises an email.

17. The computer program product of claim 15, wherein the predetermined set of characters comprises non-alphanumeric characters.

18. The computer program product of claim 15, wherein the computed value comprises a hash value.

19. The computer program product of claim 15, wherein the comparing the computed fingerprints to determine a set of documents whose fingerprints are sufficiently similar further comprises:

comparing the computed values for each paragraph of a first document to the computed values for each paragraph of a second document;

determining a number of matches of the computed values; and determining that the first and second documents are related based on the number of matches.

20. The computer program product of claim 19, wherein the determining that the first and second documents are related based on the number of matches further comprise:

dividing the number of matches by a number of possible matches; and determining that the first and second documents are related if a result of the dividing step is above a predetermined threshold value.

21. The computer program product of claim 15, wherein the set of documents are ordered based on date.

22. A method for deploying an application for threading documents, comprising:

providing a computer infrastructure being operable to:

compute a fingerprint for each of a plurality of documents by analyzing text in a body of each document, wherein the fingerprint computing comprises:

breaking each document into paragraphs;

stripping a predetermined set of characters from each paragraph;

computing a value for remaining characters in each paragraph; and collecting the computed values for each paragraph to provide the fingerprint;

compare the computed fingerprints to determine a set of documents from the plurality of documents whose fingerprints are sufficiently similar; and order the set of documents to create at least one parent-child relationship.

23. A method for threading documents, comprising:

computing a fingerprint for each of a plurality of documents by analyzing text in a body of each document, wherein the computing further comprises breaking each document into paragraphs;

stripping a predetermined set of characters from each paragraph;

computing a value for remaining characters in each paragraph; and collecting the computed values for each paragraph to provide the fingerprint;
comparing the computed fingerprints to determine a set of documents from the plurality of documents whose fingerprints are sufficiently similar, wherein the comparing further comprises:
comparing the computed values for each paragraph of a first document to the computed values for each paragraph of a second document;
determining a number of matches of the computed values; and
determining that the first and second documents are related based on the numbers of matches; and
ordering the set of documents to create at least one parent-child relationship.

* * * * *